United States Patent
Bhabbur

(10) Patent No.: US 10,554,652 B2
(45) Date of Patent: Feb. 4, 2020

(54) PARTIAL ONE-TIME PASSWORD

(71) Applicant: CA, Inc., New York, NY (US)

(72) Inventor: Gyaneshwar Bhabbur, Secunderabad (IN)

(73) Assignee: CA, Inc., New York, NY (US)

( * ) Notice: Subject to any disclaimer, the term of this patent is extended or adjusted under 35 U.S.C. 154(b) by 222 days.

(21) Appl. No.: 15/450,870

(22) Filed: Mar. 6, 2017

(65) Prior Publication Data

US 2018/0255053 A1 Sep. 6, 2018

(51) Int. Cl.
*H04L 29/06* (2006.01)
*G06F 21/00* (2013.01)

(52) U.S. Cl.
CPC .................... *H04L 63/0838* (2013.01)

(58) Field of Classification Search
CPC ............... H04L 63/0838; H04L 9/3228; H04L 2209/04
See application file for complete search history.

(56) References Cited

U.S. PATENT DOCUMENTS

| | | | | |
|---|---|---|---|---|
| 7,904,946 B1* | 3/2011 | Chu | ...................... | H04L 63/067 726/10 |
| 8,353,017 B2* | 1/2013 | Cerruti | ................... | G06F 21/31 726/1 |
| 9,881,146 B2* | 1/2018 | Zheng | ..................... | G06F 21/31 |
| 2003/0163739 A1* | 8/2003 | Armington | ............. | G06F 21/32 726/3 |
| 2006/0021036 A1* | 1/2006 | Chang | ..................... | G06F 21/31 726/22 |
| 2012/0140929 A1* | 6/2012 | Clark | ..................... | G06F 21/79 380/277 |
| 2014/0101738 A1* | 4/2014 | Sama | ..................... | G06F 21/31 726/6 |
| 2014/0215601 A1* | 7/2014 | Rittle | ..................... | G06F 21/36 726/16 |
| 2016/0021094 A1* | 1/2016 | Dong | ..................... | H04L 63/083 713/183 |
| 2016/0373430 A1* | 12/2016 | Bhat | .................... | H04L 63/0823 |
| 2017/0171185 A1* | 6/2017 | Camenisch | ........... | H04L 63/083 |
| 2018/0189469 A1* | 7/2018 | Nam | ..................... | G06F 21/32 |
| 2018/0191702 A1* | 7/2018 | Padmanabhan | ....... | H04L 63/083 |

* cited by examiner

*Primary Examiner* — Lisa C Lewis
(74) *Attorney, Agent, or Firm* — Kowert, Hood, Munyon, Rankin & Goetzel, P.C.

(57) ABSTRACT

Techniques are disclosed relating to authenticating a user based on a partial password. In one embodiment, a computer system stores masking criteria defining how a mask is to be applied to generated passwords. In some embodiments, the computer system receives a request from a user to generate a one-time password. In response to the request, in some embodiments, the computer system generates the one-time password having a sequence of characters, applies the mask to the generated one-time password to select a subset of the sequence of characters usable to authenticate the user, and presents the selected subset of characters to the user as a partial password for authentication.

16 Claims, 8 Drawing Sheets

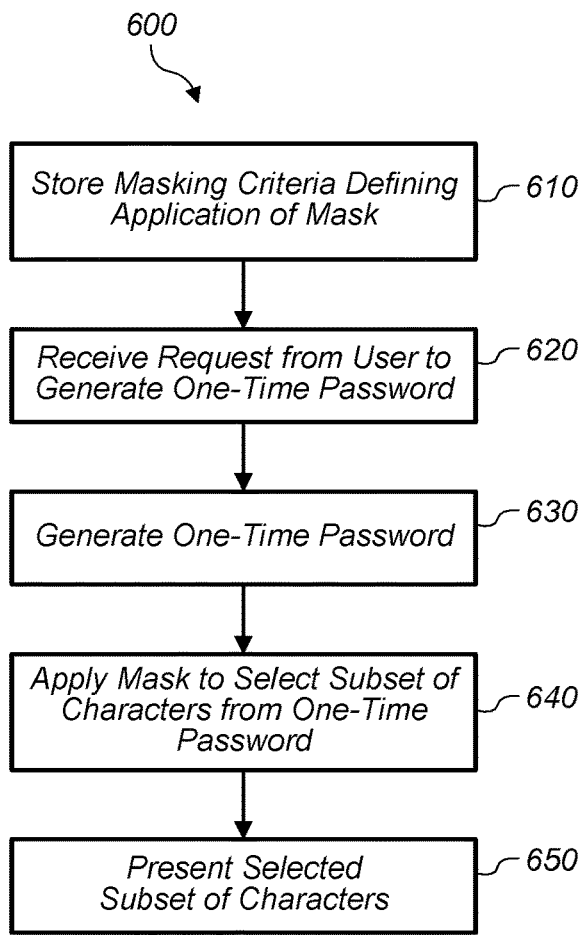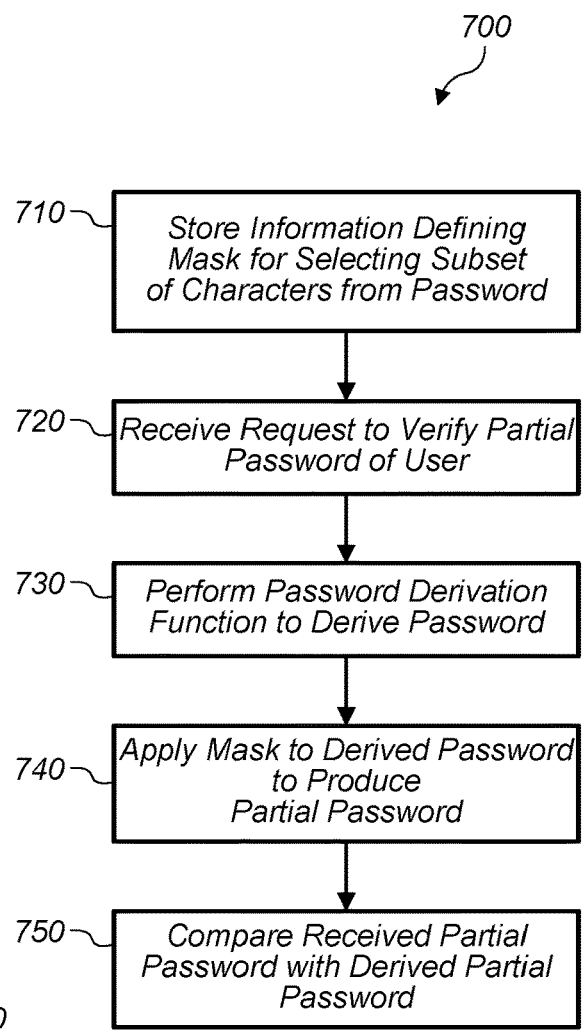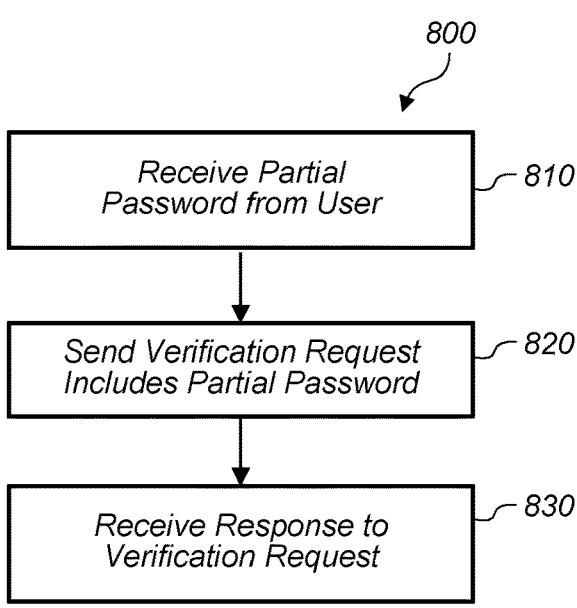

PARTIAL ONE-TIME PASSWORD

BACKGROUND

Technical Field

This disclosure relates generally to authentication, and, more specifically, to generating partial one-time passwords.

Description of the Related Art

When a user typically wishes to gain access to resources protected by a computer, the user provides both a username and a password to that computer. Thereafter, the computer may look-up the user based on the username and compare the password against the known password of an authorized user in order to authenticate the user. Once a user has successfully been authenticated, the computer may present an interface to the user for accessing the requested resources. In some instances, the computer may implement multi-factor authentication in which a user provides additional forms of identification.

SUMMARY

The present disclosure describes embodiments in which a computer system generates and presents a partial password to a user. In some embodiments, a one-time password (OTP) may be generated by a computer system assisting a user with authentication. In such an embodiment, the computer system may retrieve masking criteria defining how a mask is to be applied to an entire OTP and generate a partial OTP by applying the mask to the OTP to select a subset of characters from the entire OTP. After selecting a subset of the characters for the partial OTP, the computer system may present the partial OTP to a user, which uses the partial OTP, instead of the entire OTP, to authenticate.

BRIEF DESCRIPTION OF THE DRAWINGS

FIG. 6 is a flow diagram illustrating an exemplary method for generating a partial OTP based on masking criteria.

FIG. 7 is a flow diagram illustrating an exemplary method for verifying a partial OTP.

FIG. 8 is a flow diagram illustrating an exemplary method for authenticating a user requesting access to a computer system.

Figure 1:
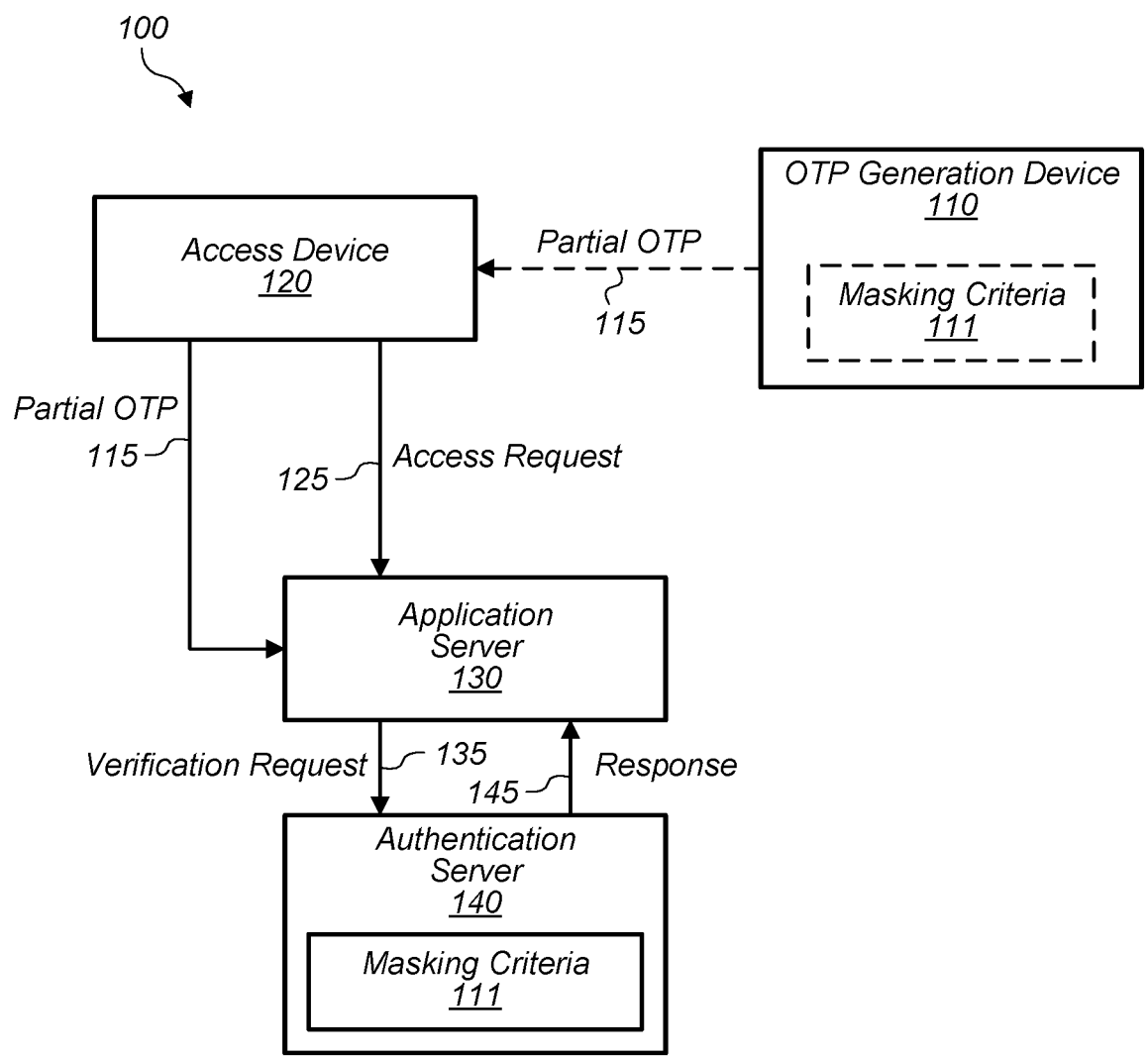
FIG. 1 is a block diagram illustrating exemplary elements of a system that facilitates authentication using partial passwords, according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "network interface configured to communicate over a network" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a one-time password that has multiple portions, the terms "first" portion and "second" portion can be used to refer to any portion of that password. In other words, the first and second portions are not limited to the initial two portions of a one-time password.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

As more companies begin to implement additional security measures to protect their resources from unauthorized users, the prominence of multi-factor authentication begins to increase as well. One form of multi-factor authentication is the use of one-time passwords (OTPs). As used herein, the term "one-time password" is to be interpreted in accordance with its understood meaning in the art and refers to a password that is valid for a single transaction or session with a computer system. In many instances, OTPs may take the form of a numeric or alphanumeric string of characters. As an example, when a user attempts to access their online bank account, the financial system associated with the user's account may require the user to enter a six-digit OTP (e.g., 178239), which may be generated by a program accessible to the user or sent to a device owned by the user (e.g., via a text message).

The present disclosure recognizes that prior OTP authentication schemes are susceptible to harvesting attacks (e.g., man-in-the-middle, key loggers, etc.) in which an attacker may collect a large sample of OTPs to determine the underlying information (e.g., seeds) used to generate the OTPs being used. In doing so, an attacker may be able to predict subsequent, valid OTPs, which could be used to authenticate as the user. The present disclosure, however, describes techniques for generating an entire OTP and providing only characters/portions of that OTP (referred to as a partial OTP), which can be used to authenticate a user in lieu of the entire OTP. For example, in one embodiment, a computer system may generate a twelve-digit OTP and select, from the twelve digits, six digits to be provided. If an attacker manages to collect a large sample of partial OTPs, however, the attacker cannot easily guess the underlying information used to derive the OTPs as the attacker is missing portions of the OTPs due to the selection. Still further, even if the attacker were able to determine the underlying information, the attacker would still be missing the criteria used to select the characters making up the partial OTPs. As such, authenticating using partial passwords may provide a greater level of security while maintaining the current user experience.

Turning now to FIG. 1, a block diagram of a system 100 for authenticating using partial passwords is shown. In the illustrated embodiment, system 100 includes an OTP generation device 110, an access device 120, an application server 130, and an authentication server 140. In various embodiments, system 100 may be implemented differently than shown. Accordingly, while OTP generation device 110 and access device 120 are shown as two separate devices, in some embodiments, devices 110 and 120 may be a single device. Similarly, functionality of application server 130 and the authentication server 140 may be performed by a single server. System 100 may also include more (or less) elements than shown such as additional application servers 130 that communicate with authentication server 140.

OTP generation device 110, in one embodiment, facilitates generating a partial OTP 115 usable to authenticate a user. Accordingly, in some embodiments, device 110 is configured to generate an entire OTP and then derive the partial OTP 115 from the entire OTP. In such an embodiment, device 110 may store information (shown as masking criteria 111) defining how to select a subset of characters from an entire OTP. For example, a generated OTP may have the character sequence "123456", and masking criteria 111 may define a mask as a string of bits "100101" where 1s indicate characters is to be selected and 0s indicate characters to be removed/masked away. Accordingly, an application of the mask to the OTP may produce a partial OTP of "146" for authenticating the user. If the 1s, however, indicated a character to be removed, device 110 may remove the characters "146" and present a partial OTP of "235". In various embodiments, device 110 may receive masking criteria 111 from authentication server 140, a user when setting up device 110 to perform OTP generation, or some other suitable source. In FIG. 1, masking criteria 111 is depicted as a dotted box to indicate that device 110 may not include criteria. Accordingly, in other embodiments, device 110 generates an OTP, but relies on a separate entity (e.g., a user or access device 120) to derive the partial OTP 115. For example, device 110 may generate and present a twelve-character OTP to the user, who selects the characters for the partial OTP 115. In such an embodiment, the user may leverage knowledge of an agreed upon selection/masking scheme.

Once a partial OTP 115 is generated, it may be provided to access device 120 to authenticate a user. In some embodiments, device 110 provides the OTP 115 directly to access device 120. In other embodiments, device 110 may indirectly provide the OTP 115 (as indicated by the dotted line) as a user may read the partial OTP from a display associated with device 110 and enter the partial OTP into an interface of access device 120. OTP generation device 110 is described below in further detail with respect to FIG. 2.

Access device 120, in one embodiment, is a computer system through which a user attempts to gain access to resources, which may be located at another computer system such as application server 130. Accordingly, when a user wishes to gain access to a resource (e.g., a service, data, etc.) provided by server 130, device 120 may generate an access request 125 for the resource. In various embodiments, this request 125 may include user credentials (e.g., username and password, biometric information, first and last name, a credit card number, an email address, a social security number, etc.) along with the partial OTP 115. In other embodiments, however, a partial OTP 115 may be sent separately from request 125—i.e., in a later or earlier transmission. Access device 120 is described below in further detail with respect to FIG. 3.

Application server 130, in some embodiments, maintains a resource for which a user of access device 120 is trying to gain access. (In other embodiments, this resource may be located elsewhere such as at device 120.) This resource may be any suitable resource for which authentication is warranted such as an application hosted by server 130, confidential information, use of a service provided by server 130, access to particular hardware, etc. In the illustrated embodiment, application server 130 relies on authentication server 140 to handle authentication of a user, rather than performing authentication locally. (As noted above, however, functionality of servers 130 and 140 may be implemented by the same computer system.) Application server 130 is described below in further detail with respect to FIG. 4.

Authentication server 140, in one embodiment, verifies a user's identity in order to determine whether a user should gain access to a particular resource. As shown, server 140 may perform this verification in response to receiving a verification request 135, which may include a user's credentials and partial OTP 115 from access request 125. Accordingly, to service such a request 135, server 140 may begin by confirming that the supplied credentials match those of an authorized user. In order to determine whether a partial OTP is valid, server 140 may perform functions similar to those discussed in regards to OTP generation device 110. That is, in various embodiments, server 140 may generate the entire OTP (or retrieve a previously stored copy) and select a subset of characters of the OTP based on masking criteria 111 to derive a partial OTP. Server 140 then compares this derived partial OTP with the one supplied in request 135. If a match is determined, authentication server 140 may send a response 145 indicating that the user has successfully authenticated. If the OTPs do not match (or the user's credentials do not match those of an authorized user), server 140 may issue a response 145 indicating the authentication was unsuccessful. Authentication server 140 is described below in further detail below with respect to FIG. 5.

Figure 2:
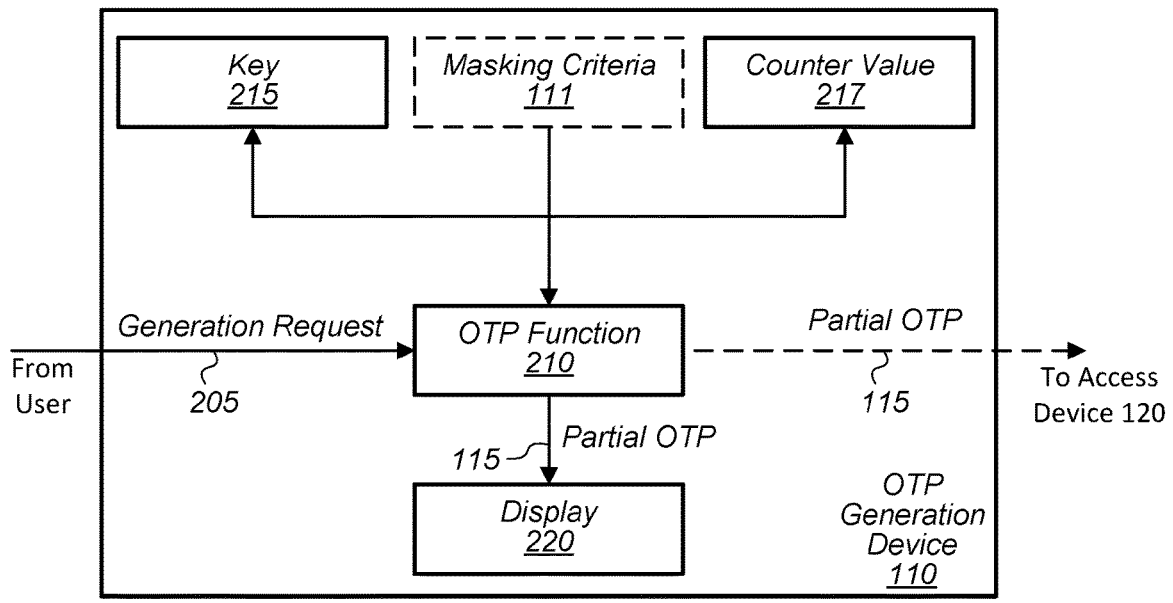
FIG. 2 is a block diagram illustrating exemplary elements of a computing device that generates a partial password, according to some embodiments.

Turning now to FIG. 2, a block diagram of one embodiment of an OTP generation device 110 is shown. As noted above, in various embodiments, device 110 is configured to facilitate the generation of a partial OTP usable to authenticate the user. Accordingly, in the illustrated embodiment, device 110 includes an OTP function 210 and a display 220. In some embodiments, device 110 also includes a key 215, masking criteria 111, and/or counter value 217.

OTP function 210, in various embodiments, is software, hardware, or a combination thereof that generates an entire OTP and, in some embodiments, derives a partial OTP 115 by selecting one or more portions of the entire generated OTP. In the illustrated embodiment, function 210 generates an OTP in response to a generation request 205, which may be supplied by a user via an interface of device 110. OTP function 210 may also take key 215, masking criteria 111, and/or counter value 217 as inputs to produce the entire OTP and partial OTP as discussed below. In various embodiments, key 215 is a symmetric key known to OTP generation device 110 and authentication server 140, which may supply key 215 before generation of an OTP; counter value 217 is an updatable value, which may be shared by OTP generation device 110 and authentication server 140 and provides entropy for OTP generation.

Although function 210 may implement any suitable algorithm for deriving the entire OTP, in some embodiments, function 210 implements a keyed-hash message authentication code (HMAC) based OTP (HOTP) algorithm, which may be implemented in accordance with Request for Comments (RFC) 4226. Accordingly, function 210 may use a counter value 217 and key 215 as inputs into a hash function (e.g., a HMAC-SHA-1 algorithm implemented in accordance with RFC 2104) to produce an HMAC of a specified bit length. Function 210 may then truncate the HMAC in order to produce the entire OTP. (In embodiments in which the user is responsible for selecting the characters of the partial OTP 115, function 210 may provide this entire OTP to display 220 for presentation to the user.) Device 110 may also increment (or decrement) counter value 217 so that the same OTP is not regenerated for a subsequent generation request 205.

In other embodiments, function 210 implements a time-based OTP (TOTP) algorithm, which may be implemented in accordance with RFC 6238. Accordingly, function 210 may use a time value (in lieu of counter value 217) and key 215 as inputs into a hash function (e.g., a HMAC-SHA-1 algorithm) to produce an HMAC of a specified bit length. In some embodiments, the time value is based on the division of the difference between the current Unix time and the Unix epoch (defined as the number of seconds that have elapsed since 00:00:00, 1 Jan. 1970) by a time step value (e.g., 30 seconds). Function 210 may then truncate the HMAC to produce the entire OTP. (As noted above, in some embodiments, this OTP may be presented to a user via display 220 in an embodiment in which a user selects characters for the partial OTP 115).

In some embodiments, after generating an entire OTP, function 210 may select a subset of values from the generated OTP using masking criteria 111. Criteria 111 may include a randomly generated value, a user-defined value, a value based on an attribute associated with a user, and so on. An example of an attribute-based value could include authenticating server 140 knowing the security code of a user's credit card and instructing device 110 or a user to select a subset of characters from an OTP using a mask defined by a base-2 representation of the security code— e.g., using a mask of 1111011 for a security code 123. The numbers of the security code could also be used to identify which characters of the OTP to select. In one embodiment, authentication server 140 generates masking criteria 111 by selecting particular attributes or generating a random sequence of characters—e.g., a bit string for a random number. Criteria 111 may also be defined for a single user or a group of users and may be applied to one or more OTPs. As an example, the sales department of a company may have one set of masking criteria 111 while the R&D department of the same company has a different set of masking criteria 111. In some embodiments, once the partial OTP 115 has been generated, function 210 provides the partial OTP to display 220, which presents the partial OTP to a user. In another embodiment, function 210 may send the partial OTP without user involvement—e.g., to access device 120 directly via a wireless communication.

Figure 3:
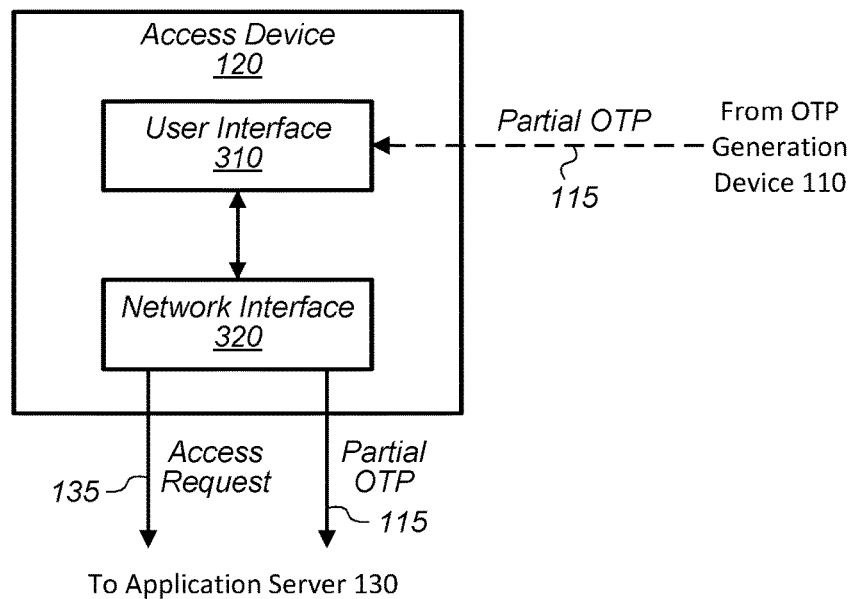
FIG. 3 is a block diagram illustrating exemplary elements of an access device through which a user gains access to an application server, according to some embodiments.

Turning now to FIG. 3, a block diagram of one embodiment of an access device 120 is shown. As noted above, in various embodiments, access device 120 is a device used by a user to request access to a resource provided by application server 130 and may be further used to access the resource. In the illustrated embodiment, access device 120 includes a user interface 310 and a network interface 320.

User interface 310 may be any suitable user interface through which a user can initiate an access request 125 and/or enter a partial OTP 115. Accordingly, when a user wishes to gain access to a resource associated with application server 130, user interface 310 may present a prompt to the user asking for the user to provide user credentials and/or partial OTP 115. In some embodiments, this prompt is a web page supplied by application server 130. In some embodiments, access device 120 may prepopulate entries in the prompt with the user's credentials and, in some embodiments, the partial OTP 115 if provided by OTP generation device 110 directly.

Network interface 320 may be any suitable interface for communicating with application server 130. In some embodiments, after user interface 310 receives the user's credentials and/or partial OTP 115, device 120 generates a corresponding access request 125 for the resource and sends the access request 125 along with the partial OTP 115 to application server 130 via network interface 320. In some embodiments, access request 125 and partial OTP 115 may be sent together; however, in other embodiments, access request 125 and partial OTP 115 may be sent separately. In response to sending elements 125 and 115, network interface 320 may receive an indication of whether the authentication of the user was successful, which may be presented to the user via user interface 310. If the user is granted access to a resource, a corresponding display may be presented to the user via user interface 310.

Figure 4:
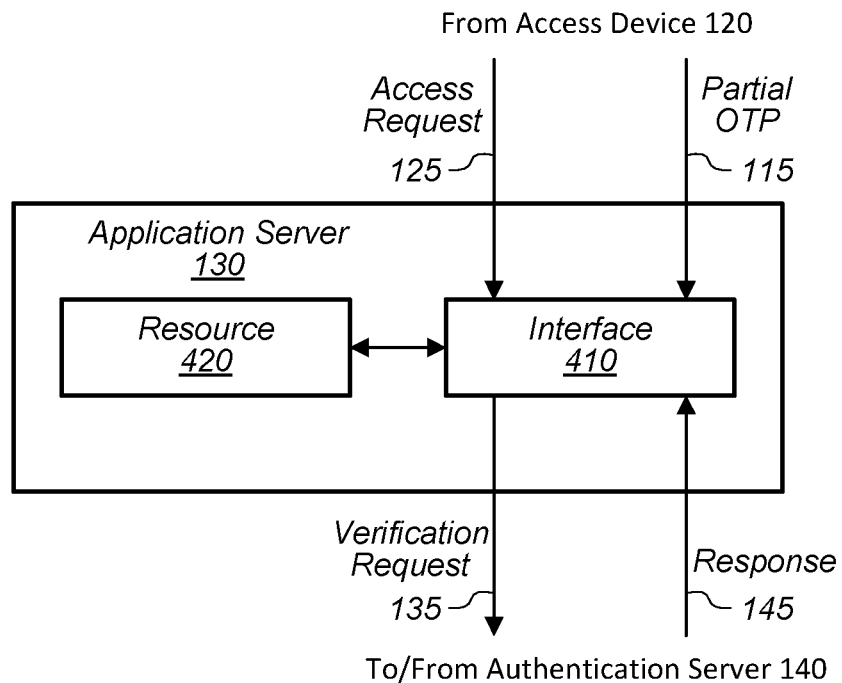
FIG. 4 is a block diagram illustrating exemplary elements of an application server that provide resources to users, according to some embodiments.

Turning now to FIG. 4, a block diagram of one embodiment of an application server 130 is shown. As discussed above, in some embodiments, application server 130 is a computer system that provides access to a resource requested by a user. In the illustrated embodiment, application server 130 includes a network interface 410 and a resource 420. While an application server is depicted, server 130 may correspond to other types of servers such as a file server, a mail server, a print server, a web server, a game server, and so on.

Interface 410 may be any suitable interface that allows application server 130 to interact with access device 120 and authentication server 140. In various embodiments, interface 410 generates and provides a user interface to access device 120 through which a user may request and access resource 420. Accordingly, interface 410 may receive an access request 125 and a partial OTP 115, which may be sent together in access request 125 or separately. In response to receiving the partial OTP 115, application server 130 may send a verification request 135 that includes the partial OTP 115 along with any other user credentials included in access request 125 to authentication server 140. Authentication server 140 may then attempt to verify the user credentials and the partial OTP 115 and may send, to interface 410, a response 145 indicating a successful authentication or an unsuccessful authentication. After a user has been authenticated, in various embodiments, interface 410 grants the user access to resource 420 through the provided user interface.

As noted above, resource 420 may be any suitable resource for which a user desires access to such as stored information, use of a service provided by application server 130, access to particular hardware, etc. As examples of stored information, resource 420 may be a photo, an application, a document, a music file, a video file, etc. As examples of a service, resource 420 may be a map service, a streaming service, a dating service, etc. As examples of hardware, resource 420 may be a central processing unit, a graphics processing unit, encryption and decryption hardware, etc. Accordingly, access request 125 may specify a particular resource 420.

Figure 5:
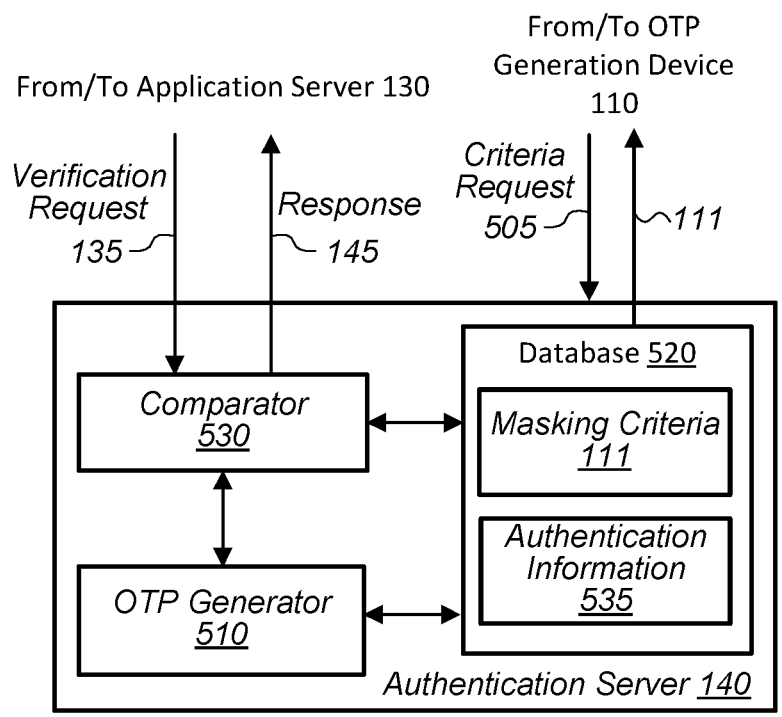
FIG. 5 is a block diagram illustrating exemplary elements of an authentication server that verifies user credentials and partial passwords, according to some embodiments.

Turning now to FIG. 5, a block diagram of one embodiment of an authentication server 140 is shown. As noted above, in some embodiments, authentication server 140 is a computer system that verifies a user's identity in order to determine whether a user should gain access to a resource 420. In the illustrated embodiment, authentication server 140 includes various components, including an OTP generator 510, a database 520, and a comparator 530. These components may be software routines, hardware, or a combination thereof. As shown database 520 includes masking criteria 111 and authentication information 535. In some embodiments, authentication server 140 may be implemented differently than as shown—e.g., authentication server 140 may be implemented by multiple computer systems configured as a computer cluster.

OTP generator 510, in various embodiments, generates an entire OTP and derives from this OTP, a partial OTP 115 by selecting one or more characters. Accordingly, OTP generator 510 may implement functionality similar that discussed in reference to device 110 such as the use of masking criteria 111 and performance of OTP generation algorithms such as HOTP and TOTP. In various embodiments, OTP generator 510 generates and derives the same OTPs as those of device 110 so that comparator 530 may verify a user's identify. In order to generate and derive these same OTPs, device 110 and OTP generator 510 may use the same masking criteria 111 and input values such as key 215, counter value 217, and the same time value. As such, OTP generator 510 may utilize other components such as database 520 to share masking criteria 111 and the input values with device 110. In various embodiments, OTP generator 510 sends partial OTPs or entire OTPs to comparator 530. In embodiments in which time is an input for generating an OTP, OTP generator 510 may generate OTPs at set time intervals and temporally store them at database 520.

Database 520, in various embodiments, stores masking criteria 111 and authentication information 535. Authentication information 535 may include any suitable information that identifies a particular user such as a username, a password, biometric information, time-based partial OTPs, and so on. Accordingly, database 520 may provide any of this information to the other components of authentication server 140 and, in some cases, device 110. As shown for example, authentication server 140 may receive a criteria request 505 from device 110 and subsequently, database 520 may send masking criteria 111 to device 110.

Comparator 530, in various embodiments, verifies the identity of a user by comparing information from the user against information associated with an authorized user. In various embodiments, comparator 530 receives a verification request 135 that includes user credentials and/or a partial OTP 115, and requests the appropriate information from database 520 and OTP generator 510. After receiving the appropriate information, comparator 530 may compare partial OTP 115 with a partial OTP from OTP generator 510 (or, in some embodiments, database 520) and the user credentials with authentication information 535. In response to a successful comparison (i.e., a match), in various embodiments, comparator 530 sends a response 145 indicating that the user should be granted access to the particular resource 420.

Turning now to FIG. 6, a flow diagram of a method 600 is shown. Method 600 is one embodiment of a method performed by a computer system (e.g., OTP generation device 110) to generate and present a partial OTP (e.g., partial OTP 115). In some instances, performance of method 600 may provide additional authentication security by complicating a malicious actor's attempt to determine how an OTP is generated. In some embodiments, method 600 may be implemented differently than shown—e.g., including additional steps such as requesting masking criteria from an authentication system (e.g., server 140), receiving another OTP generated by another computer system and presenting the other OTP to the entity, etc.

Method 600 begins in step 610 with a computer system storing masking criteria (e.g., masking criteria 111) defining how a mask is to be applied to a generated OTP. In various embodiments, the masking criteria defines what portions of a generated OTP to select for the partial OTP. The computer system may receive this masking criteria from an authentication system that also stores the criteria. Moreover, the computer system may retrieve and store values (e.g., key 215, counter value 217, etc.) from the authentication system that are used as inputs into an OTP generation algorithm (e.g., HOTP, TOTP, etc.). The computer system may also retrieve and store a time value from a time-keeping system (e.g., a network time protocol (NTP) server).

In step 620, the computer system receives a request from a user to generate an OTP. In various embodiments, the computer system receives this request from the user via a user interface. In step 630, the computer system generates an OTP having a sequence of characters, which may be generated using an OTP generation algorithm such as HOTP, TOTP, etc. In step 640, the computer system applies the mask to the generated OTP to select a subset of characters usable to authenticate the user. In some embodiments, this selection may include selecting unmasked characters after the mask has been applied; in other embodiments, this selection may include selecting characters of the generated OTP without masking any portions. In step 650, the computer system presents the selected subset of characters (i.e. the partial OTP). In some embodiments, step 650 may include presenting the characters to the requesting entity or another computer system through which a user authenticates.

Turning now to FIG. 7, a flow diagram of a method 700 is shown. Method 700 is one embodiment of a method performed by a computer system (e.g., authentication server 140) to determine whether a received partial OTP (e.g., partial OTP 115) is valid. In some instances, performance of method 700 may provide additional authentication security by complicating a malicious actor's attempt to determine how an OTP is generated. In some embodiments, method 700 may be implemented differently than shown.

Method 700 begins in step 710 with a computer system storing information (e.g., masking criteria 111) defining a mask for selecting a subset of characters from a password (e.g., OTP) to produce a partial password. In various embodiments, in response to receiving a request (e.g., request 505) from a password generation device for the masking criteria, the computer system may provide the masking criteria to the generation device. In some instances, before providing the masking criteria, the computer system may verify that the generation device is registered/authorized to generate partial passwords on behalf of the user. The computer system may also provide a secret key (e.g., key 215), a counter value (e.g., value 117) and a time value to the generation device.

In step 720, the computer system receives a request to verify a first partial password of a user. In one embodiment, the computer system generates the first partial password and sends it to a first computer system associated with the user and then receives the first partial password from a second computer system associated with the user. Prior to or in conjunction with receiving the first partial password, in some embodiments, the computer system receives and verifies user credentials supplied In step 730, the computer system performs a password derivation function to derive a password. The computer system may perform any suitable algorithm such as the ones discussed above including HOTP and TOTP. After performing a password derivation function that uses a counter value, the computer system may update the counter value in order to derive a subsequent password.

In step 740, the computer system applies the mask to the derived password to produce a second partial password. In some instances, the same masking criteria may be used by a plurality of password generation devices or users to generate one or more partial passwords.

In step 750, the computer system compares the characters included in the first partial password with those of the second partial password to determine whether the passwords match. In various embodiments, in response to determining a match, the computer system may provide a result of the verifying to the application server.

Turning now to FIG. 8, a flow diagram of a method 800 is shown. Method 800 is one embodiment of a method performed by a computer system (e.g., application server 130, a desktop computer, a laptop computer, a mobile device, etc.) to authenticate a user. In some instances, performance of method 800 may provide additional authentication security by complicating a malicious actor's attempt to determine how an OTP is generated. In some embodiments, method 800 may be implemented differently than shown.

Method 800 begins in step 810 with a computer system receiving a first partial password (e.g., partial OTP 115) of a user. In various embodiments, a second computer system (e.g., OTP generation device 110) presents information indicative of the first partial password to the user. In some embodiments, the presented information may be the partial password that the user provides to the computer system; however, in other embodiments, the information may be an entire password from which the user derives the partial password. In one embodiment, the computer system also receives user credentials for authentication.

In step 820, the computer system sends a verification request including the first partial password to a third computer system (e.g., application server 130, authentication server 140, or a combination thereof) configured to verify the first partial password. In various embodiments, the third computer system verifies the first partial password by generating a password using a password generation algorithm (e.g., HOTP, TOTP, etc.), selecting a subset of values from the password to create a second partial password, and comparing the first partial password and the second partial password.

In step 830, the computer system receives a response to the verification request from the third computer system. The response may indicate a result of the verifying of the partial password. In some cases, the result indicates a match between the partial password and a partial password generated by the authentication system. In other cases, the result indicates that match did not occur. In some embodiments, in response to the indication being a match, the computer system grants the user access to the requested resource. In other embodiments, the user is granted access to resources associated with another computer system.

Figure 9:
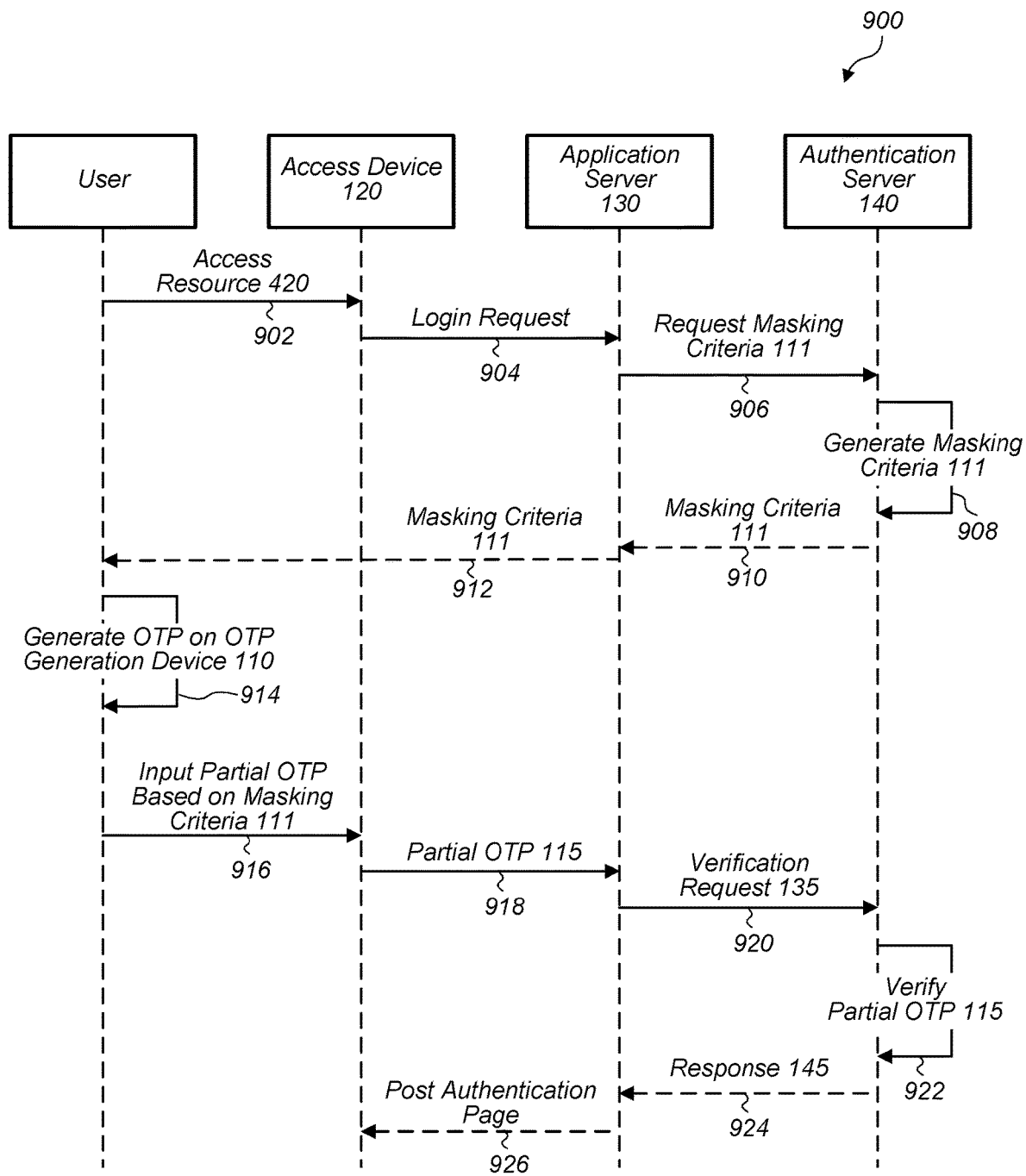
FIG. 9 is a communication diagram illustrating exemplary communications associated with authenticating with a partial OTP generated based on masking criteria provided by a server.

Turning now to FIG. 9, a communication diagram illustrating an exemplary interaction 900 that includes various communications for authenticating with a partial OTP is shown. In various embodiments, interaction 900 involves a user deriving a partial OTP 115 by applying masking criteria 111 to an entire OTP. In the illustrated embodiment, interaction 900 includes a user, OTP generation device 110, access device 120, application server 130, and authentication server 140. In some embodiments, interaction 900 may be implemented differently than shown.

As shown in FIG. 9, interaction 900 begins at 902 with a user wishing to gain access to a resource 420 of application server 130. At 904, the user causes access device 120 to send a login request (which may correspond to access request 125 or be distinct from request 125) to application server 130, which in turn at 906, sends a request for masking criteria 111 to authentication server 140. At 908, authentication server 140 generates the masking criteria 111 and at 910, provides it to application server 130. Authentication server 140 may generate criteria 111 using any of the generation schemes discussed above. At step 912, application server 130 provides masking criteria 111 to the user. In some embodiments, application server 130 sends masking criteria 111 to the user via access device 120; in other embodiments, criteria 111 is sent to another device associated with the user such as device 110. In other embodiments, the user already has knowledge of masking criteria 111 (e.g., since the user may have defined criteria 111), and thus, steps 906-912 may not be performed.

At 914, the user causes OTP generation device 110 to generate an entire OTP. At 916, the user applies making criteria 111 to the generated OTP to derive a partial OTP 115, which the user inputs into access device 120. At 918, access device 120 sends partial OTP 115 to application server 130, which sends a verification request 135 that includes partial OTP 115 to authentication server 140 at 920. At 922, authentication server 140 verifies partial OTP 115 by comparing it with a partial OTP generated at server 140. At 924, authentication server 140 sends a response 145 to application server 130 that indicates a successful authentication. In some cases, response 145 indicates an unsuccessful authentication. At 926, application server 130 presents a post authentication page to access device 120 for displaying to the user.

Figure 10:
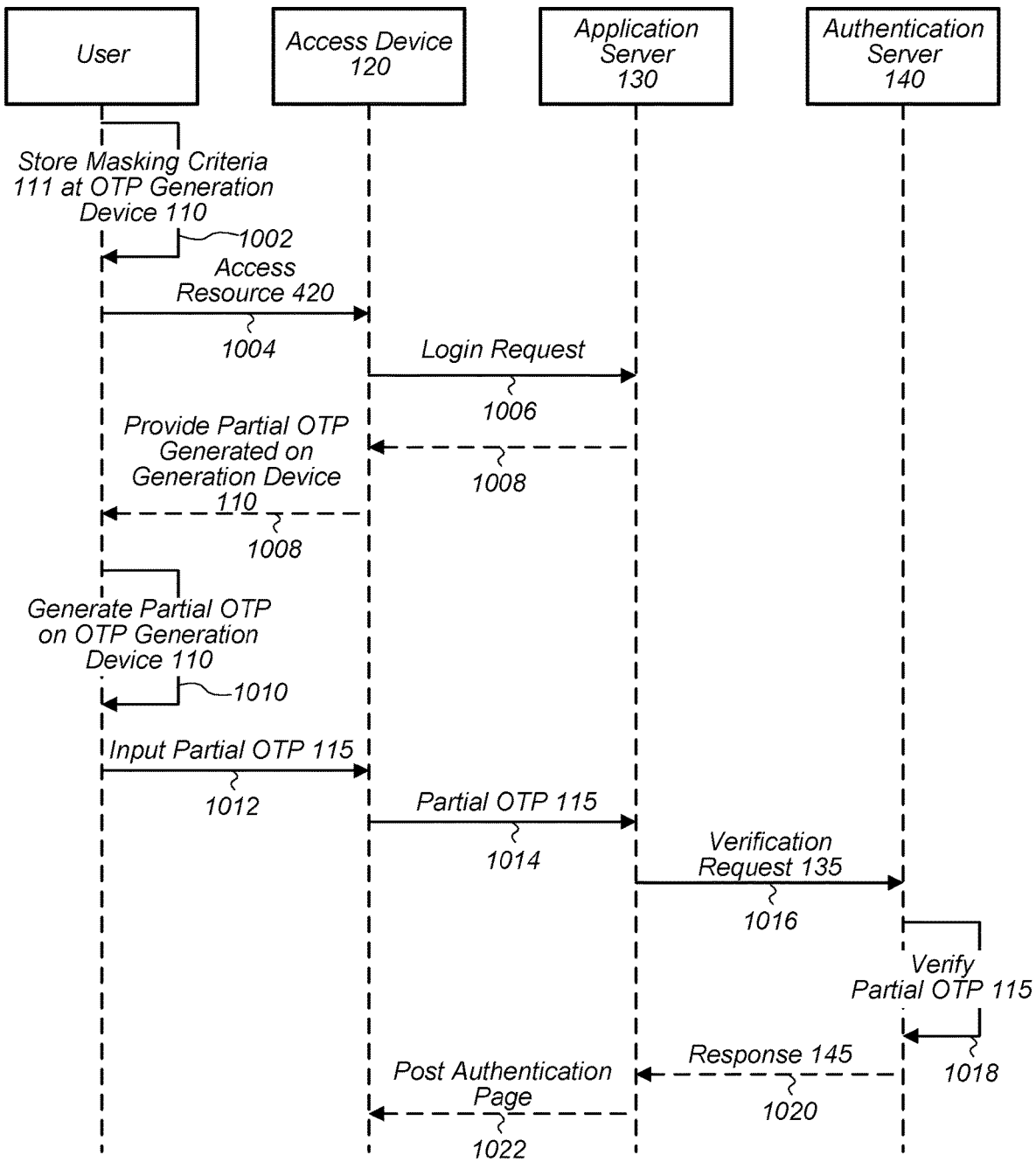
FIG. 10 is a communication diagram illustrating exemplary communications associated with authenticating with an OTP generated based on masking criteria stored by an OTP generation device.

Turning now to FIG. 10, a communication diagram illustrating an exemplary interaction 1000 that includes various communications for authenticating with a partial OTP is shown. In various embodiments, interaction 1000 involves OTP generation device 110 deriving a partial OTP 115 by applying masking criteria 111 to an entire OTP. In the illustrated embodiment, interaction 1000 includes a user, OTP generation device 110, access device 120, application server 130, and authentication server 140. In some embodiments, interaction 1000 may be implemented differently than shown.

As shown in FIG. 10, interaction 1000 begins at 1002 with a user storing masking criteria 111 at OTP generation device 110. In one embodiment, masking criteria 111 is stored on OTP generation device 110 during an installation of OTP function 210. At 1004 and 1006, the user desires to access a resource 420 at application server 130 and thus causes access device 120 to send a login request to server 130. At 1008, application server 130 sends a request to the user, via access device 120, for a partial OTP 115 that may be generated by OTP generation device 110. At 1010, the user causes OTP generation device 110 to generate an entire OTP and apply the stored masking criteria 111 to the OTP to derive partial OTP 115, which may be displayed to the user. At 1012, the user provides partial OTP 115 to access device 120, which in turn at 914, sends it to application server 130. At 1016, application server 130 sends a verification request 135 that includes partial OTP 115 to authentication server 140. At 1018, authentication server 140 verifies partial OTP 115 by comparing partial OTP 115 with a partial OTP generated by server 140. At 1020, authentication server 140 sends a response 145 to application server 130 that indicates a successful authentication (or, in some instances, an unsuccessful authentication). At 1022, application server 130 presents a post authentication page to access device 120 for displaying to the user.

Figure 11:
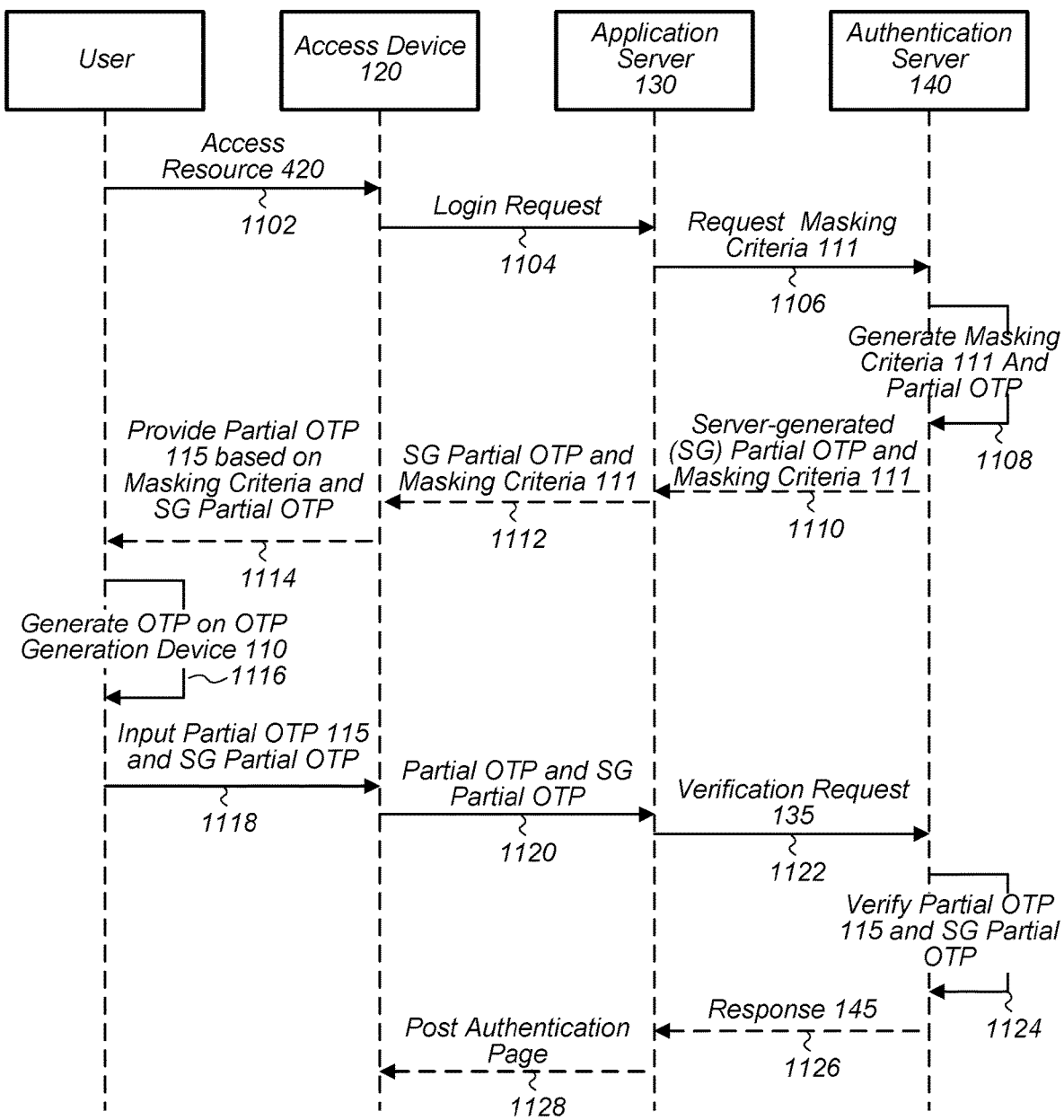
FIG. 11 is a communication diagram illustrating exemplary communications associated with an authentication based on multiple OTPs.

Turning now to FIG. 11, a communication diagram illustrating an exemplary interaction 1100 that includes various communications for authenticating with multiple partial OTPs is depicted. In various embodiments, interaction 1000 involves access device 120 presenting an OTP to a user that was received from authentication server 140 and the user deriving a partial OTP 115 using masking criteria 111. In the illustrated embodiment, interaction 1100 includes a user, OTP generation device 110, access device 120, application server 130, and authentication server 140. In some embodiments, interaction 1100 may be implemented differently than shown.

As show in FIG. 11, interaction 1100 begins at 1102 with a user wishing to gain access to a resource 420 at application server 130. At 1104, the user causes access device 120 to send a login request to application server 130, which in turn at 1106, requests masking criteria 111 from authentication server 140. At 1108, the authentication server 140 generates a partial OTP and masking criteria 111 and at 1110, provides them to application server 130, which passes them on to access device 120 at 1112. In some embodiments, application server 130 sends the server-generated partial OTP to the user via a system separate from access device 120. At 1114, the user is instructed to derive and provide a partial OTP 115 to access device 120 along with the server-generated partial OTP. At 1116, the user causes OTP generation device 110 to generate an OTP and then the user derives partial OTP 115 by applying masking criteria 111, received from access device 120, to the generated OTP. At 1118, the user provides both the derived partial OTP 115 and the server-generated partial OTP to access device 120, which passes them on to application server 130 at 1120. At 1122, application server 130 sends a verification request 135 that includes both partial OTPs to authentication server 140, which in turn at 1124, verifies both partial OTPs. At 1126, authentication server 140 sends a response 145 indicates a successful authentication or an unsuccessful authentication. At 1128, in some embodiments where the authentication was successful, application server 130 sends a post authentication page to access device 120 for displaying to the user.

Exemplary Computer System

Figure 12:
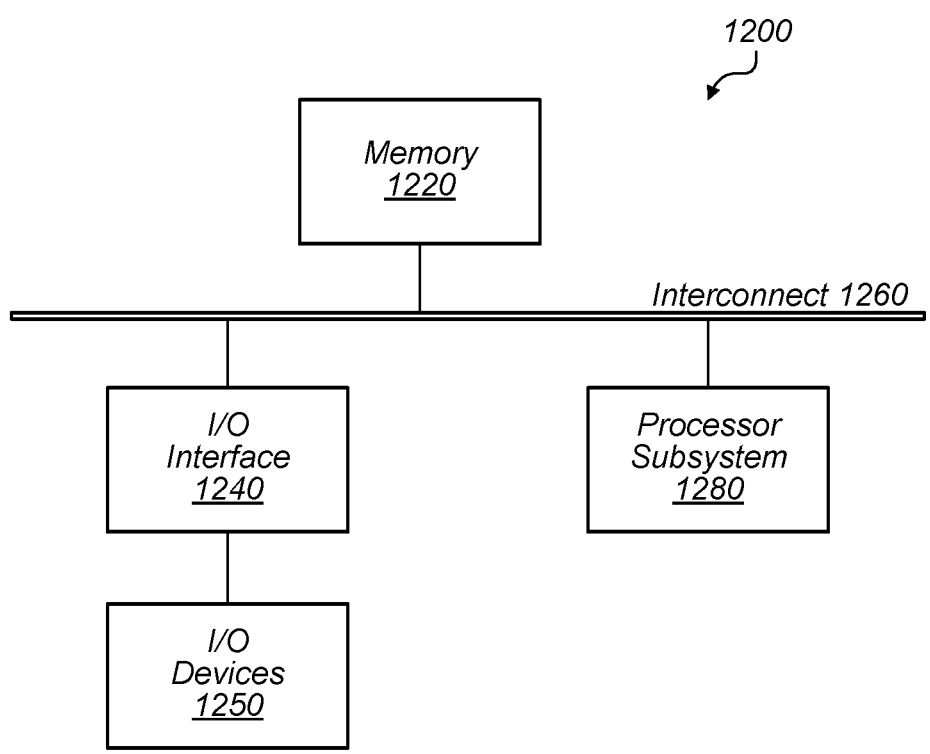
FIG. 12 is a block diagram illustrating an exemplary computer system, according to some embodiments.

Turning now to FIG. 12, a block diagram of an exemplary computer system 1200, which may implement any of the various computer systems 110-140 disclosed herein, is depicted. Computer system 1200 includes a processor subsystem 1280 that is coupled to a system memory 1220 and I/O interfaces(s) 1240 via an interconnect 1260 (e.g., a system bus). I/O interface(s) 1240 is coupled to one or more I/O devices 1250. Computer system 1200 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 1200 is shown in FIG. 12 for convenience, system 1200 may also be implemented as two or more computer systems operating together.

Processor subsystem 1280 may include one or more processors or processing units. In various embodiments of computer system 1200, multiple instances of processor subsystem 1280 may be coupled to interconnect 1260. In various embodiments, processor subsystem 1280 (or each processor unit within 1280) may contain a cache or other form of on-board memory.

System memory 1220 includes one or more computer readable media usable store program instructions executable by processor subsystem 1280 to cause system 1200 perform various operations described herein. System memory 1220 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 1200 is not limited to primary storage such as memory 1220. Rather, computer system 1200 may also include other forms of storage such as cache memory in processor subsystem 1280 and secondary storage on I/O Devices 1250 (e.g., a hard drive, storage array, etc.). In some embodiments, these other forms of storage may also store program instructions executable by processor subsystem 1280 to cause system 1200 to implement functionality described herein.

I/O interfaces 1240 may be any of various types of interfaces configured to couple to and communicate with other devices, according to various embodiments. In one embodiment, I/O interface 1240 is a bridge chip (e.g., Southbridge) from a front-side to one or more back-side buses. I/O interfaces 1240 may be coupled to one or more I/O devices 1250 via one or more corresponding buses or other interfaces. Examples of I/O devices 1250 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 1200 is coupled to a network via a network interface device 1250 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer readable medium having program instructions stored thereon that are executable by a computer system to implement a partial password generator capable of performing operations comprising:
   storing masking criteria defining how a mask is to be applied to generated passwords;
   receiving a request from a user to generate a first partial password;
   in response to the request:
      generating a first password having a sequence of characters;
      applying the mask to the first password to select a first subset of the sequence of characters to derive the first partial password;
   receiving, from an authentication server system, a second partial password derived by the authentication server system selecting a second subset of characters from a second password generated by the authentication server system, wherein the first and second partial passwords are combinable to be used to authenticate the user at the authentication server system; and
   presenting the first and second partial passwords on a display of the computer system.

2. The computer readable medium of claim 1, wherein the operations further comprise:
   receiving a secret key associated with the authentication server system, wherein the authentication server system is configured to verify a combination of the first and second partial passwords; and
   receiving a synchronized time value indicative of a current time; and
   wherein the generating of the first password is based on the secret key and the synchronized time value.

3. The computer readable medium of claim 1, wherein the operations further comprise:
   receiving a secret key and a counter value; and
   using the secret key to apply a keyed hash function to the counter value to generate the first password.

4. The computer readable medium of claim 1, wherein the operations further comprise:
   prior to storing the masking criteria, sending a request for the masking criteria to another computer system, wherein the request identifies the user; and
   receiving, from the other computer system, masking criteria associated with the user, wherein the stored masking criteria is the received masking criteria.

5. A non-transitory computer readable medium having program instructions stored thereon that are executable by a computer system to implement an authentication server system capable of performing operations comprising:
   storing information defining a mask for selecting a subset of characters from a given password to produce a given partial password of a user;
   generating a first password having a sequence of characters;
   applying the mask to the first password to select a first subset of the sequence of characters to derive a first partial password;
   providing the first partial password to a partial password generator;
   receiving a request to verify the first partial password and a second partial password, wherein the second partial password is derived by selecting a second subset of characters from a second password generated by the partial password generator; and
   verifying the first and second partial passwords by:
      performing a password derivation function to derive a third password;
      applying the mask to the third password to produce a third partial password; and
      comparing the second partial password with the third partial password.

6. The computer readable medium of claim 5, wherein the request is received from an application server system configured to grant a user access to a resource at the application server system, and wherein the operations further comprise:
   sending a result of the verifying to the application server system.

7. The computer readable medium of claim 5, wherein the password derivation function has a secret key and a counter value as inputs, and wherein the operations further comprise:
   in response to performing the password derivation function, updating the counter value to derive a subsequent password.

8. The computer readable medium of claim 5, wherein the operations further comprise:

provisioning a mobile device of the user with the information defining the mask and a secret key, wherein the provisioning enables the mobile device to generate the first partial password using the partial password generator.

9. The computer readable medium of claim 5, wherein the operations further comprise:

employing a time synchronization protocol to obtain a synchronized time; and using a secret key to apply a keyed hash function to the synchronized time to derive the first password.

10. The computer readable medium of claim 5, wherein the mask is usable by a plurality of users to generate one or more partial passwords.

11. A method, comprising:

an application server system receiving a first partial password generated by a partial password generator and a second partial password generated by an authentication server system selecting a first subset of characters from a first password generated by the authentication server system, wherein the first and second partial passwords are usable to authenticate a user;

the application server system sending, to the authentication server system, a verification request that includes the first and second partial passwords, wherein the authentication server system is configured to verify the first partial password by generating a second password using a password generation algorithm, selecting a second subset of values from the second password to create a third partial password, and comparing the first partial password and the third partial password; and the application server system receiving, from the authentication server system, a response to the verification request.

12. The method of claim 11, further comprising:

based on the response, the application server system granting the user access to a resource of the application server system.

13. The method of claim 11, wherein the response indicates that the user is granted access to a resource of the authentication server system.

14. The method of claim 11, further comprising:

prior to receiving the first partial password, the application server system receiving, from the authentication server system, information indicating a third subset of values to be selected from an entire password; and the application server system presenting, to the user, an interface that identifies the third subset of values to be selected by the user.

15. The method of claim 11, further comprising:

the application server system sending the first partial password to a computer system for displaying to the user.

16. The method of claim 11, wherein the password generation algorithm includes using a key to apply a hash function to a seed value and a counter value maintained by the authentication server system.

* * * * *